United States Patent [19]
Kidder

[11] Patent Number: 5,457,757
[45] Date of Patent: Oct. 10, 1995

[54] OPTICAL CONTROL PANEL

[76] Inventor: John S. Kidder, 1749 Trafalgati Rd., Vancouver, B.C., Canada, V6K 2R9

[21] Appl. No.: 912,339

[22] Filed: Jul. 13, 1992

[51] Int. Cl.⁶ .............................. G02B 6/26; G02B 6/32; G02B 6/42; H01J 5/16
[52] U.S. Cl. ..................... 385/16; 385/18; 250/227.22
[58] Field of Search ......................... 385/16–19, 20–22; 250/227.11, 227.22

[56] References Cited

U.S. PATENT DOCUMENTS

| | | | |
|---|---|---|---|
| 3,781,092 | 12/1973 | Sussman et al. | 385/16 |
| 4,623,217 | 11/1986 | Hallen | 385/16 |
| 5,031,985 | 7/1991 | Shinoda et al. | 385/16 |
| 5,046,806 | 9/1991 | Kidder et al. | 385/16 |
| 5,090,791 | 2/1992 | Kidder et al. | 385/18 |
| 5,153,757 | 10/1992 | Cloonan et al. | 385/16 X |

*Primary Examiner*—Akm E. Ullah

[57] ABSTRACT

An optical control panel system which communicates by means of light to an electro-mechanical control system which, in turn, couples to various sensors and loads. The loads may, for example, be motors that perform various functions and the sensors may be plant system monitors for monitoring various facets of a process.

6 Claims, 4 Drawing Sheets

*PRIOR ART*

OPTICAL CONTROL PANEL

BACKGROUND

The present invention relates to an optical control panel system which communicates by means of light to an electro-mechanical control system which, in turn, couples to various sensors and loads. The loads may, for example, be motors that perform various functions and the sensors may be plant system monitors for monitoring various facets of a process.

Conventional control panels utilize switches, annunciators and indicator lights which are operated electrically. Such control panels, as a consequence, require numerous wires and connectors to bring electrical current to the various lights and switches on the panel. Failures on the panel can, therefore, arise as a result of burnt out indicator lights or annunciator lights, faulty switches, shorts or bad connections in the wiring. Moreover, cross talk and other interference problems also occur. Finally, it is necessary to couple the various lights, switches and annunciators to the various electro-mechanical elements which interface to the sensors and lodes. Often the various logic circuits, relays, etc. are located in locations remote from the control panel as a result of which electrical current has to travel relatively large distances. The task of simply connecting wires to all of the logic circuits, and electro-mechanical elements and at the same time avoiding the possibility of arcing or short circuits is a major problem. Consequently, there is a need for a control panel which eliminates the requirement of electrically operated lights and switches.

U.S. Pat. No. 5,090,791 issued Feb. 25, 1992 to Kidder et al. discloses a self-illuminated fibre optic switch which, through mechanical actuation, switches light from an input path to one or more output paths. At the same time there is also disclosed the use of a separate illumination light source to illuminate separate portions of a cap to indicate whether or not the switch is "on" or "off". U.S. Pat. No. 5,046,806 issued Sep. 10, 1991 to Kidder et al. discloses the use of a single fibre control switch in which an illumination source generates light which is directed along an optical fibre to an actuator or switch. Depending on the switch position light is returned back along the same fibre and passes on to a pair of detectors which, from the colour of the light received, can detect the state of the actuator. Although such fully optical switches are now known, realization of such switches to create a fully optical control panel is not known. U.S. Pat. No. 3,999,074 issued to Callaghan discloses a single fibre loop in an optical shutter which interrupts the light path as a means of control. The Callaghan system, however, is not able to discriminate between an "off" control state and an optical system failure which results in no return light.

Accordingly, it is an object of the invention to provide a fully optical control panel. It is a further object of the invention to provide such a control panel in which an optical system failure is readily detectable.

SUMMARY OF THE INVENTION

According to the invention there is provided an optical control system which includes an optical switch having a signal status light input, a load status light input and an ON and OFF signal output. The ON and OFF signal output are positioned so that when the switch is in an ON position, light is directed from the signal status light input to the ON output and with the switch in the OFF position, light is directed from the signal status light input to the OFF output. A light source is coupled to the signal status light input of the switch and a shutter is positioned in the load status light line. The shutter is operative in response to a control signal for controlling the light to the load status light input. A differential amplifier is coupled to the ON and OFF signal outputs of the switch. Logic circuit having an input coupled to the differential amplifier as an output coupled to the load and an input shutter control line also coupled to the load. The differential amplifier together with the use of ON and OFF signal outputs subtracts out the noise and makes the output of the differential amplifier close to the absolute signal value.

Preferably, also included is an annunciator, an annunciator fibre optic line coupled thereto and a shutter in the annunciator fibre optic line for controlling the flow of light along the latter. The shutter is activated and deactivated in response to control signals from the logic circuit.

Advantageously, there is included an input line to the logic circuit for coupling to a remote sensor wherein said input line is determinative of the illumination of the annunciator.

Advantageously the system includes a plurality of optical switches and a plurality of annunciators.

BRIEF DESCRIPTION OF THE DRAWINGS

The novel features believed characteristic of the invention are set forth in the appended claims. The invention itself, however, as well as other features and advantages thereof, will be best understood by reference to the description which follows, read in conjunction with the accompanying drawings, wherein:

DETAILED DESCRIPTION WITH REFERENCE TO THE DRAWINGS

Figure 1:
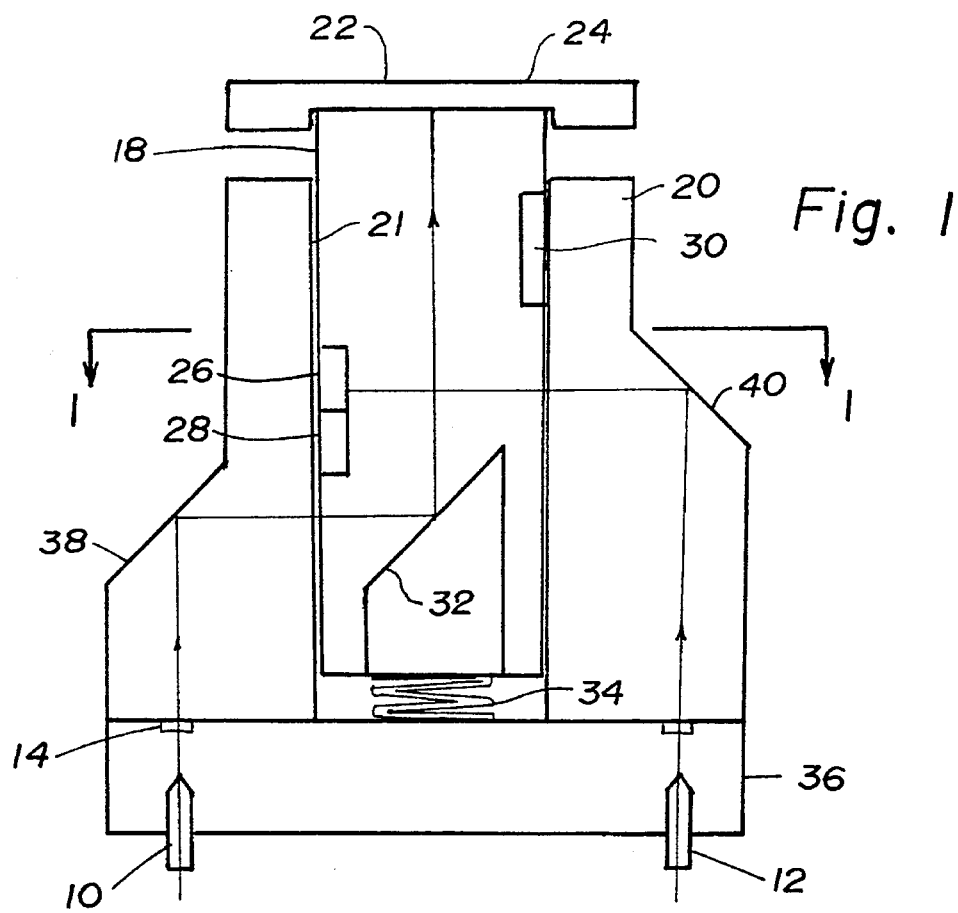
FIG. 1 is in elevation view in section of a fully optical switch which switches signal light and at the same time utilizes a separate source of light to illuminate a status display light.
Figure 2:
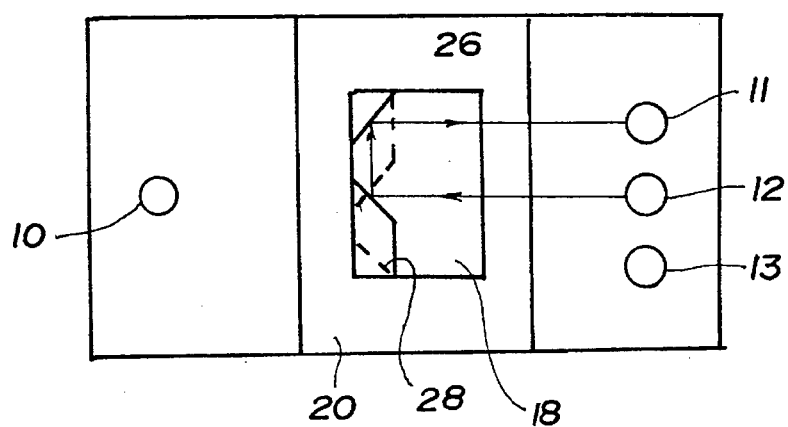
FIG. 2 is a section taken along the line 1—1 of FIG. 1.

Referring to FIG. 1 there is shown a self-illuminated fibre optic switch as shown in U.S. Pat. No. 5,090,791 issued to Kidder et al. showing a transparent body 20 having a receptacle 21 of rectangular cross-section. Angled shoulders 38 and 40 on the body 20 are mirrored and serve as reflectors of light travelling internally in the transparent body 20. A plunger 18 is insertable in the square receptacle 21 on top of which is located a pair of different coloured cap portions 22 and 24. On one elongated side of the plunger 18 there are a pair of retrore-flectors 26 and 28 displaced laterally from one another. A latch 30 controls movement of the plunger and allows it to move upwardly under the action of a spring 34 when the switch is in the "on" position. A mirrored angled surface 32 is formed in the plunger. Input signal light arrives via fibre optic line 12 passes through a collimating lense 16 striking angled surface 40 and impinges on reflector 26. Reflector 26 causes light from fibre optic line 12 to be directed into output fibre optic line 11 when the switch is in the "depressed" or "off" position. With the switch in the "on"

position the plunger 18 is permitted to be retracted from the receptacle 21 so that light from fibre optic line 12 strikes reflector 28 and is directed into output fibre optic line 13 (see FIG. 2). Illumination light arrives via fibre optic line 10, passes through collimating lense 14 and strikes mirrored angled shoulder surface 38. The light after being reflected by mirrored surface 38 strikes the mirrored surface 32 on the plunger, and when the latter is in the "on" position, the light is reflected onto the coloured portion 22, which the user will see as indicating switch "on" status. By utilizing a cap having a third portion (not shown) which extends over angled shoulder 40 and by employing a beam splitter through the partial silvering of angled surface 40, some of the signal light could be used to illuminate this third portion so as to display the fact that the signal light is being received by the switch.

Figure 3:
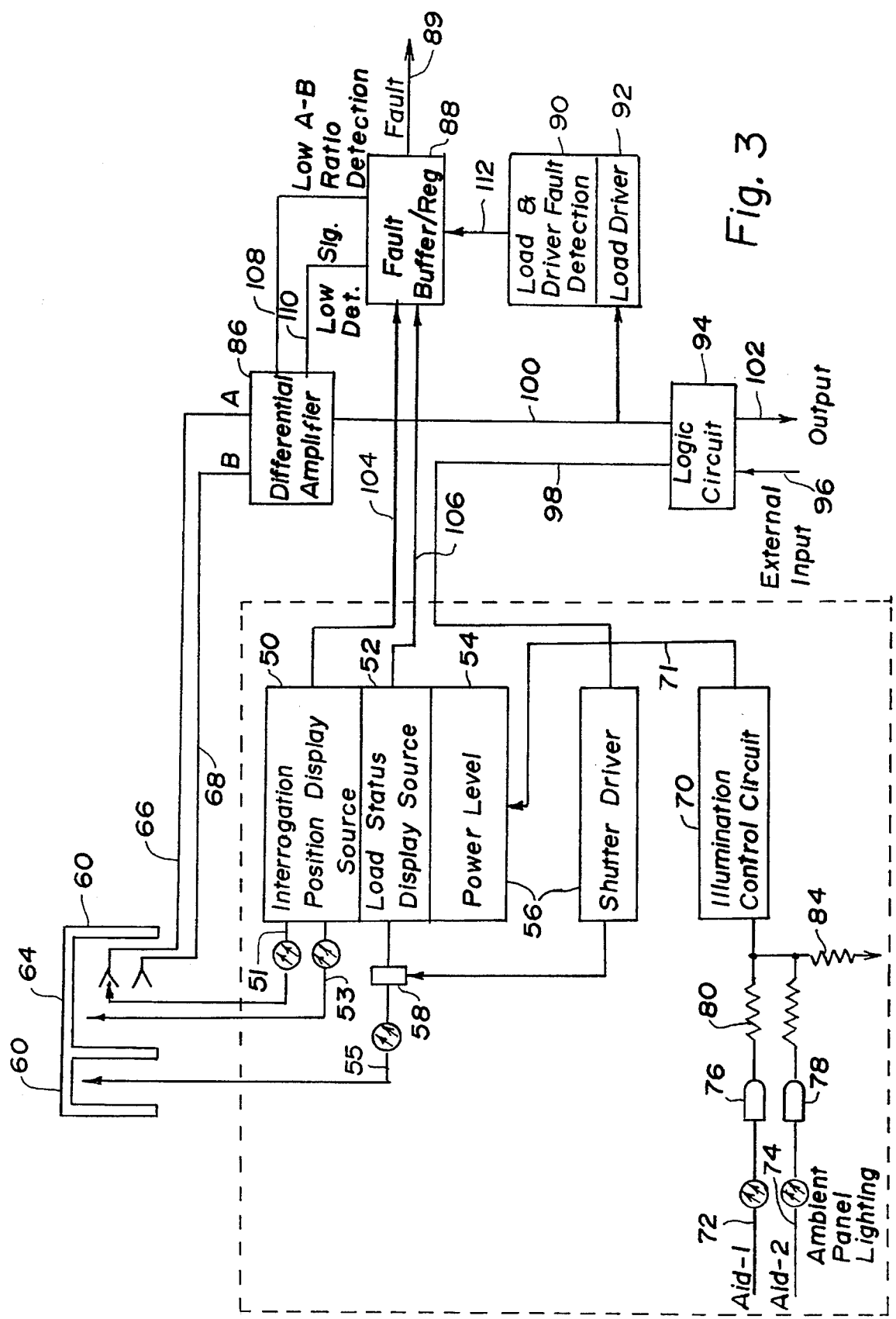
FIG. 3 is a schematic diagram showing a configuration for a single switch control panel.

Referring to FIG. 3 there is shown utilization of such a switch 60 having an on/off portion 62 and a signal light receiving portion 64. The switch 60, in effect, comprises the control panel while the portion shown in a dotted outline constitutes the illumination source or illumination module. The portion to the right of the dotted outline corresponds to the opto-electric module or electronic control circuitry. The illumination source consists of an interrogation and position display source 50 which generates light along lines 51 and 53. Light along line 53 impacts on portion 64 of cap 60 whereas that along line 51 impinges on either fibre optic line 66 or 68 depending on the position of switch 60. An on/off display source 52 generates light along line 55 which impinges on portion 62 of switch 60. The latter light is controlled by means of a shutter 58 operated by a shutter driver 56. The shutter 58 may be an ordinary mechanical shutter operated by a solenoid or one of liquid crystal. A logic circuit 94 provides an output on line 98 which controls shutter driver 56.

An illumination control circuit 70 is connected by means of a line 71 to the power source 54 which is adjustable. A pair of fibre optic receivers 72 and 74 labelled AID-1 and AID-2 located at different locations of a room receive ambient light and direct it to photo-electric transistors 76 and 78. The current generated by transistors 76 and 78 is added together through the medium of resistors 80, 82 and 84 and the summed current is applied to the illumination control circuit 70. It is the latter current which determines the output on line 71 and hence the power level applied to the on/off display source 52. Display source 50 responds to changes in the ambient light and, thus, cause changes in the intensity of the light in lines 55, 51 and 53. Light arriving on fibre-optic lines 66 and 68 are directed to two respective inputs of a differential amplifier 86. The output of the differential amplifier 86 is applied along line 100 both to a load driver 92 and to the logic circuit 94. The logic circuit 94 in response to the signal level on line 100 provides an output on line 102 which is applied to a load (not shown). The signal level on line 100 may also be applied to a load driver 92 directly. Problems with either the differential amplifier 86 or with the illumination sources 50 and 52 is detected by default buffer/register circuit 88. In the event the ratio of the signal levels on lines A and B is low or in the event the signal level is low a fault buffer 88 generates a fault signal on line 89. In addition, a load fault or driver fault is detected by unit 90 and applied along line 112 to the fault buffer 88.

In operation an external input on line 96 coupled to a remote sensor (not shown) is applied to the logic circuit 94. Depending on the signal level produced on line 98 by the logic circuit 94 the shutter driver may cause the insertion or retraction of shutter 58. This controls the illumination light displayed on cap portion 62. The switch position of switch 60 is indicated by the output of the differential amplifier 86. In one position light on line 51 will be received by line 66 in the other position, by line 68. When light is being received by fibre optic line 66, line 68 will be receiving noise so that the output of the differential amplifier 86 will, in effect, have noise subtracted to produce a signal closely related to the absolute signal level. In the event the ambient light in the room is lowered the illumination control circuit 70 will cause the output of the power level 54 to lower which, in turn, will lower the output from sources 50 and 52.

Figure 4:
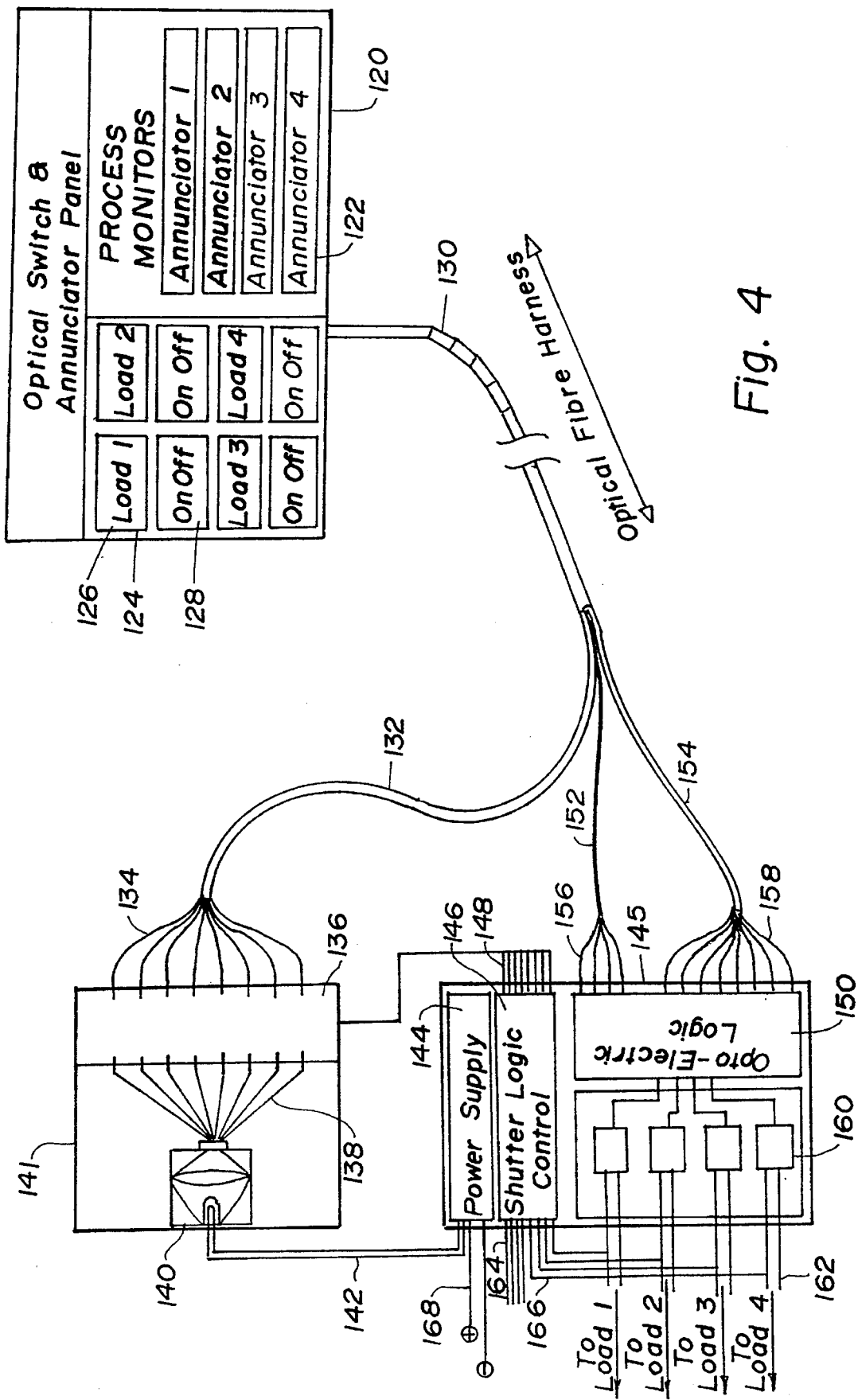
FIG. 4 shows the configuration for a multi switch multi-annunciator control panel.

Referring to FIG. 4 there is shown an optical switch and an annunciator panel with a plurality of load switches 124 and annunciator indicators 122. Each load switch consists of an on/off display portion 128 and a load display portion 126. The panel 120 is coupled by means of a bundle of fibre optic cables 130 to an illumination module 141 by means of cables 132 and to an opto-electric module by means of send cables 152 and source cables 154. Illumination module 141 consists of an illumination source 140 for generating light in response to electrical current applied by means of line 142 from a power supply 144. The power supply 144 is fed by power lines 168. The light generated by the illumination source 140 is received by the individual fibres 138. The fibres 138 are coupled to a signal/annunciator optical shutter assembly 136. The latter assembly has coupled at its output a plurality of fibres 134 which form cable 132. The annunciator 136 has a plurality of shutters one for each cable 138, which either interrupt or permit passage of light from fibres 138 to a corresponding fibre 134 in response to a control signal from an associated one of fibres 148 coupled to the output of a shutter control logic circuit 146. The input lines to the shutter control logic circuit 146 consist of plurality of lines 164 coupled to remote sensors for monitoring the various processes. Another set of input lines 166 couple to respective loads 162. Individual send fibres 156 and return fibres 158 are coupled, respectively, to signal source and signal detectors on a logic circuit 150. There are two return fibres 158 for each send fibre 156. The logic circuit 150 controls a number of relays 160 each of which operates corresponding ones of loads 162.

In operation a user may press an on/off switch 128 which will immediately cause the lighting up of the on/off portion of the cap of the switch 124 provided light is being received from a signal source of the logic circuit 150. Once the corresponding load 162 has been activated an associated one of lines 166 will sense the activation of the load 162 and cause a corresponding shutter 136 to pass light from one of fibres 138 to the corresponding fibre 134. Light received on the corresponding fibre 134 causes the display portion 126 to become illuminated. The annunciators 122 are illuminated in response to the signal from the remote sensors applied to associated one of lines 164. It is the latter signal which causes the appropriate one of shutters in the shutter assembly 136 to pass light from one of fibres 138 to the corresponding other of fibres 134 and light up the corresponding annunciator indicator.

Figure 5:
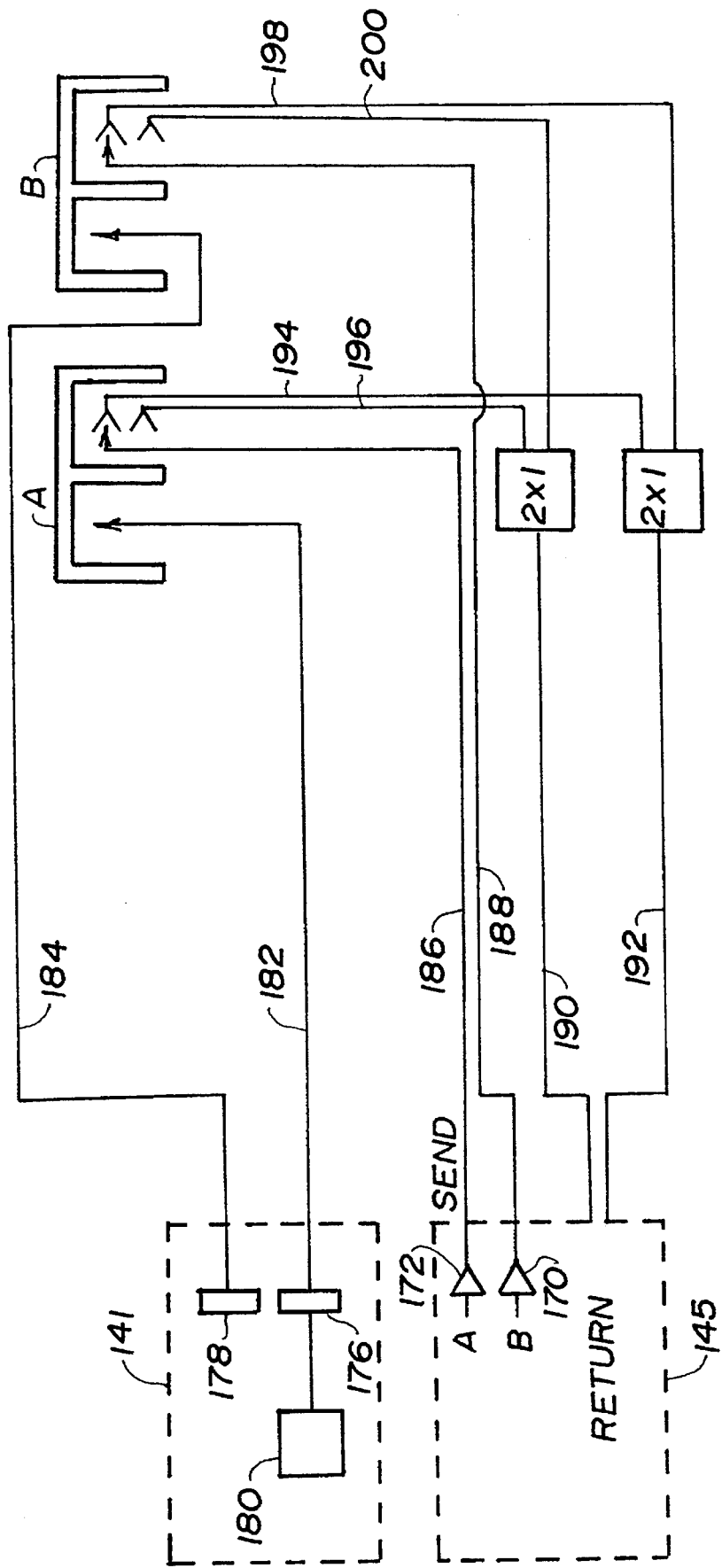
FIG. 5 is a schematic diagram showing a multiplexing of return lines.

In order to reduce the number of fibres required it is possible to multiplex the signals applied to the send fibres 156 as shown in FIG. 5. In this case individual send fibre transmitters 170 and 172 and code the transmitted optical signal using known techniques sent along each of lines 186 and 188. The off fibre 196 of switch A is multiplexed with the "off" fibre of switch B through a 2×1 multiplexer. The resultant multiplexed signals are sent along a single return line 190. Similarly the "on" signal return lines 194 and 198 of switch A and switch B, respectively, are multiplexed by a 2×1 multiplexer and sent along return line 192. Various other multiplexing schemes are possible. For example, the light transmitted along the send lines may be transmitted along a single send fibre and split into the separate switch input fibres using a 1×2 coupler. The return fibres, however, must be kept separate and be terminated at individual receivers to produce the state discrimination. This approach would result in simpler electronics because no optical signal modulation is required.

Accordingly, while this invention has been described with reference to illustrative embodiments, this description is not intended to be construed in eliminating sense. Various modifications of the illustrative embodiments as well as other embodiments of the invention, will be apparent to persons skilled in the art upon reference to this description. It is therefore contemplated that the appended claims will cover any such modifications or embodiments as fall within the true scope of the invention.

We claim:

1. An optical control system, comprising:
   (a) an optical switch having a signal status light input, a load status light input, and ON and OFF signal outputs positioned so that with said switch in an ON position light is directed from said signal status light input to said ON output and with said switch in an OFF position light is directed from said signal status light input to said OFF output;
   (b) a light source coupled to the signal status light input of said switch;
   (c) a shutter positioned in the load status light line and operative in response to a control signal for controlling the light to said load status light input;
   (d) a differential amplifier coupled to having inputs coupled to the ON and OFF signal outputs of said switch; and
   (e) a logic circuit having an input coupled to said differential amplifier, an output coupled to said load and an input shutter control line coupled to said load.

2. A system according to claim 1 including an annunciator, an annunciator fibre optic line coupled thereto, a shutter in said annunciator fibre optic line for controlling the flow of light there along, said shutter activated and deactivated in response to control signals from said logic circuit.

3. A system according to claim 2 including an input line to said logic circuit for coupling to a remote sensor, the signal level on said input line being determinative of the illumination of said annunciator.

4. An optical control panel system, comprising:
   (a) a panel having a plurality of optical switches and a plurality of annunciators;
   (b) an illumination module having a light source and a shutter assembly with a plurality of shutters operative to control light transmission from said light source to each of a plurality of light fibres coupled to respective switches and annunciators in said panel;
   (c) a logic circuit having signal source and signal detect circuits for sending light signals along each of a plurality of send fibre optic lines and detecting light received on each of a plurality of return lines, and a plurality of load outputs for activating and deactivating a plurality of loads; and
   (d) a shutter control circuit having inputs for coupling to a plurality of remote sensors and to load lines and a plurality of outputs coupled to said shutter assembly, operative to control said shutters.

5. A system according to claim 4, wherein for each send line there are two corresponding return lines.

6. A system according to claim 5, wherein one of said send and return lines as multiplexed.

* * * * *